June 21, 1960 W. T. VON DER NUELL ET AL 2,941,780
ELASTIC FLUID TURBINE AND COMPRESSOR WHEELS
Filed June 17, 1954
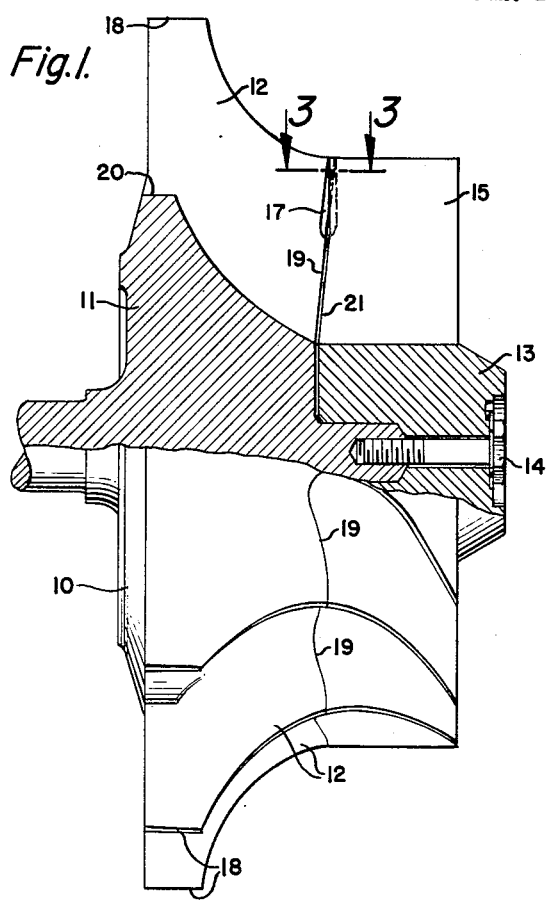
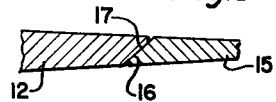
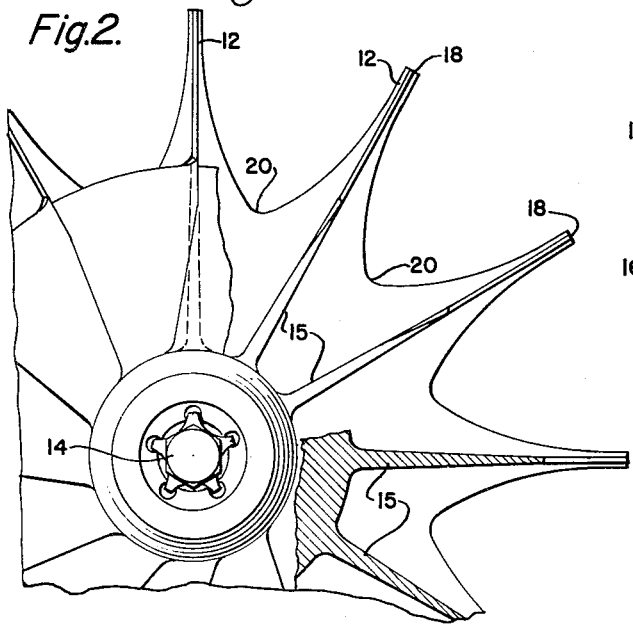
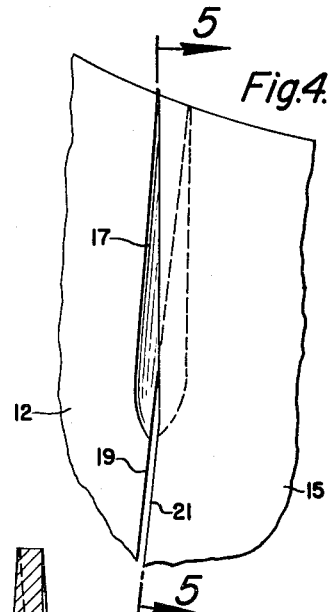
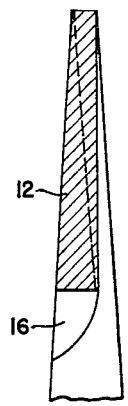
WERNER T. VON DER NUELL,
WILLIAM D. WHITAKER,
RICHARD W. WINSLOW,
INVENTORS.
BY John H. G. Wallace United States Patent Office 2,941,780
Patented June 21, 1960

2,941,780

ELASTIC FLUID TURBINE AND COMPRESSOR WHEELS

Werner T. von der Nuell, Santa Monica, Richard W. Winslow, Encino, and William D. Whitaker, Manhattan Beach, Calif., assignors to The Garrett Corporation, Los Angeles, Calif., a corporation of California Filed June 17, 1954, Ser. No. 437,512

5 Claims. (Cl. 253—39)

This invention relates to elastic fluid turbine and compressor wheels adapted to be operated at high rotational speeds and high temperatures and it has particular application to centripetal gas turbine wheels as will be described herein.

Heretofore, the structure of a centripetal gas turbine wheel or centrifugal compressor wheel has included a disc which provides a stable support for the wheel blades. The disc structure of such a wheel normally extends to the peripheral extremities of the blades thereof. Due to thermal shock and other effects encountered during the cycle of high temperature operation, shut down and starting up again, the disc structure may crack between the blades. Such disc structure extending to the periphery of the wheel also causes greater centrifugal stress in the hub structure thereof and thus limits the ability of the wheel to withstand the combined thermal and centrifugal stress of operation.

Previous wheels having no back disc and radially disposed blades, which are unsupported near their ends, have an inherent tendency toward vibration fatigue failure.

During the operation of gas turbines, their rotating wheels are subjected to high temperatures which reduce the tensile strength of the wheel material. Furthermore, centrifugal force imposed by high speed rotation of such wheels causes the structure thereof to become highly stressed. Consequently when the tensile strength of the wheel material is reduced by heat, the allowable centrifugal stresses are proportionately reduced. When it is desired to increase the overall power output of a gas turbine wheel of a certain diameter and configuration, it is usually necessary to increase its operating temperature whereby its rotational speed may be correspondingly increased. Thus, each power output increase of a given hot wheel imposes additional combined thermal and centrifugal effects thereon.

Wheel blades of the centripetal type operate adjacent an annular row of nozzles or vanes at the periphery of the wheel. Gas impulses, acting on the blades as they pass from one nozzle or vane to the next one, may cause the blades to vibrate. When vibration of unsupported blades approaches a resonant frequency thereof, fatigue of the blade structure occurs rapidly and may cause destruction of the wheel. When combined thermal and centrifugal effects are imposed on the wheel blades and a resonant condition of vibration occurs, the blades may fail very quickly.

The term "star wheel" as used herein defines a wheel having substantially radially disposed blades presenting a generally star-shaped appearance. The star-shaped appearance is occasioned by the radially tapered blades of the wheel having their extending ends projecting prominently beyond the hub structure of the wheel in cantilever relation therewith.

The term "exducer" as used herein defines a bladed hub element which is mounted on a centripetal turbine wheel and is disposed to conduct exhaust gases therefrom. When the present invention is embodied in a compressor the term "exducer" does not apply; however, an equivalent wheel blade damping means termed an "inducer" is employed. It inducts air into the bladed compressor wheel.

The term "blade damping means" as used herein defines any element which may be used to modify vibration of turbine wheel blades to prevent the occurrence of resonant vibration thereof.

According to the present invention, centrifugal stresses and vibrational effects within a wheel of a given size are reduced so that a corresponding increase of operating temperature or speed may be permitted, whereby the overall output of the turbine wheel may be increased. In order to withstand high temperatures combined with centrifugal stresses imposed by high rotational speeds, a generally star-shaped gas turbine wheel is provided with cantilever blades having means to damp vibration thereof.

The star-shaped wheel structure is subject to minimum centrifugal stress and is therefore capable of operating at higher temperatures and/or speeds. A star-shaped wheel having means for damping vibration in its cantilever blades has exhibited excellent ability to operate at high temperatures and high rotational speeds. The present invention involves a particular cooperative relationship in a star-shaped wheel having cantilever blades and means for damping the vibration thereof, whereby the wheel may be operated safely at higher temperatures and rotational speeds.

It is an object of the present invention to provide an improved bladed wheel for gas turbines and compressors which is capable of operating at high temperatures and high rotational speeds.

Another object of the invention is to provide a centripetal gas turbine wheel or centrifugal compressor wheel which is more durable than previous wheels of the type when operating under given conditions wherein the wheel rotates at high speeds and is operated at high temperatures.

Another object of the invention is to provide a centripetal gas turbine wheel having minimum centrifugal operating stress and means for damping vibration whereby the wheel may be operated safely at a higher temperature than has heretofore been practical for gas turbine operation.

A further object of the invention is to provide a novel combination of a star-shaped turbine wheel and a blade vibration-damping exducer or inducer therefor.

A still further object of the invention is to provide a turbine wheel which is capable of increasing the useful work output of a given-sized gas turbine in which it is used.

Other objects and advantages of the invention will be apparent from the following specification, claims and drawing in which:

Fig. 1 is a side elevational view of a turbine wheel in accordance with the present invention showing portions thereof broken away and in section;

Fig. 2 is a fragmentary end view of the turbine wheel according to the present invention showing portions broken away and in section;

Fig. 3 is an enlarged fragmentary sectional view taken from line 3—3 of Fig. 1;

Fig. 4 is an enlarged fragmentary side elevational view of mating portions of the wheel blades and exducer blades; and Fig. 5 is a fragmentary sectional view taken from lines 5—5 of Fig. 4.

As shown in Figs. 1 and 2 of the drawing, the invention relates to a turbine wheel 10 which is provided with a hub portion 11 having integral outwardly tapering cantilever blade portions 12 which lend a generally star-shaped appearance to the wheel. The blades 12 are integral with or otherwise secured to the hub portion of the wheel and extend in a radial direction, as shown best in Fig. 2 of the drawing. The hub portion of the wheel is generally circular when viewed from the end and has a maximum diameter in planes disposed midway between adjacent blades, substantially less than 75% of the maximum diameter of the wheel. The blades 12 project radially from the hub, the side surfaces of the blades merging into the outer surface of the hub at median points between the blades. These points are indicated in the drawing by the numeral 20. An exducer hub 13 is fixed to the wheel hub 11 by means of a bolt 14. As shown in Fig. 1, the hub 13 is smaller in diameter than hub 11, the outer surface of the latter curving inwardly and axially to register with the outer surface of the former. Hub 13 is also provided with blades 15 which are disposed in alignment with the blades 12 on the hub 11 and, in effect, constitute continuations thereof. Blades 15 carried by the exducer hub 13 are provided with bevelled portions 16 which overlap bevelled portions 17 of the blades 12 (see particularly Fig. 3). It will be noted from Figs. 1 and 4 that the aligned edges 19 and 21 of the wheel and exducer blades are slightly spaced except at the overlapping portions 16 and 17. These latter portions are disposed a greater distance from the axis of rotation of the wheel than the outermost portion of the wheel hub at the median points 20. The purpose of this arrangement will be set forth hereinafter. As shown in Fig. 1, the contour of the outer edge 18 of each blade 12 conforms substantially to the external configuration of the hub 11. The outer edge of each blade 15 similarly conforms to the outer surface of hub 13. The curved configuration of the hub and the spacing of the vanes provide passages which serve to direct fluid supplied thereto radially of the wheel at the inlet end and substantially axially thereof at the exhaust or exducer end. Since the hub is relatively small in diameter compared to the overall diameter of the wheel, the centrifugal stress therein will be minimized. The sides of each blade 12 converge both outwardly and axially toward the exhaust ends, also reducing the stress resulting from centrifugal force and thus making the wheel safer for operation at high speeds and high temperatures. This blade configuration is further advantageous because of the vibration-resisting qualities inherent therein.

As shown in Figs. 3 and 4, the overlapping surfaces 16 and 17 of the blades 15 and 12, respectively, are disposed into one plane, at right angles to the axis of the wheel 10 and in another plane, at an angle of substantially 45° thereto. The exducer blades 15 are provided with edges 21 arranged in spaced relation with the edges 19 of the blades 12 in order to permit each of the blades 12 and 15 to vibrate in accordance with its natural frequency. The difference in the vibrating frequencies of the blades 12 and 15 causes vibration damping of the blades by interference with each other at the surfaces 16 and 17. The edges 19 and 21 of the blades 12 and 15, respectively, are disposed at an acute angle to the axis of the wheel in order to provide a convenient arrangement for the disposition of the overlapping surfaces 16 and 17.

The operation of the turbine wheel in accordance with the present invention is substantially as follows: When the wheel 10 is rotating at high speeds and is driven by gas having a high temperature, the elevated temperature of the blades 12 causes the tensile strength thereof to be reduced, thus limiting allowable centrifugal stresses therein. When the blades 12 are operating at their maximum temperature and centrifugal stress level, effects of vibration are minimized by the damping action provided by engagement of the overlapping surfaces 16 and 17 of the blades 12 and 15, respectively. Thus the cantilever structure of the blade 12 which tends to vibrate under highly stressed conditions is prevented from reaching a condition of resonant vibration and, therefore, the amplitude of vibration is maintained at a minimum permitting the blades 12 to operate under high temperatures and in a highly stressed condition. The generally star-shaped wheel structure having cantilever blades is one which promotes minimum centrifugal stresses in the blades and hub for a given speed. In order to take advantage of the inherent minimum stress level of such a wheel blade structure, it is necessary to provide means for damping such blades since they have no disc support adjacent their radially disposed extremities. It will be understood that the star-shaped wheel having cantilever blades is inherently capable of operating at high temperatures and high rotational speeds wherein combined thermal and centrifugal effects, if accompanied by resonant vibration, might cause failure of the blades. It will be recognized that the cooperative relationship between the star-shaped wheel having cantilever blades and means for damping the blades renders the turbine wheel of the present invention highly successful in withstanding high temperatures and high rotational speeds.

The embodiment of the invention shown and described herein exemplifies its application to a centripetal gas turbine wheel. It will be at once apparent to those skilled in the art, however, that the invention may be readily applied to centrifugal compressors.

We claim:

1. In an elastic fluid wheel having an axis of rotation; a plurality of circumferentially spaced blades extending radially relative to the axis of rotation, each of said blades having a center plane substantially parallel with the axis of rotation and side surfaces which converge in an axial direction, said side surfaces of each blade diverging from the radially outer end of the blade and connecting with the side surfaces of adjacent blades at points spaced from said axis of rotation less than 75% of the distance between such axis and the radially outer ends of the blades; and means connected with said wheel and engaging said blades at a location spaced further from said axis of rotation than the outermost points of connection of the side surfaces of adjacent blades to damp the vibrations of said blades.

2. In an elastic fluid wheel having an axis of rotation; a plurality of circumferentially spaced blades extending radially relative to the axis of rotation, each of said blades having a center plane substantially parallel with the axis of rotation and side surfaces which converge in an axial direction, said side surfaces of each blade diverging from the radially outer end of the blade and connecting with the side surfaces of adjacent blades at points spaced from said axis of rotation less than 75% of the distance between such axis and the radially outer ends of the blades; and means connected with said wheel for damping vibration of said blades, said means comprising an exducer having blades contacting the first-mentioned blades at locations spaced further from said axis of rotation than the outermost points of connection of the side surfaces of adjacent blades.

3. In an elastic fluid wheel having an axis of rotation; a plurality of circumferentially spaced blades extending radially relative to the axis of rotation, each of said blades having a center plane substantially parallel with the axis of rotation and side surfaces which converge in an axial direction, said side surfaces of each blade diverging from the radially outer end of the blade and connecting with the side surfaces of adjacent blades at points spaced from said axis of rotation less than 75% of the distance between such axis and the radially outer ends of the blades; and means connected with said wheel comprising an exducer hub coaxial with the wheel and having radially extending blades provided with portions in axially overlapping relationship with the first mentioned blades to damp vibrations thereof, said overlapping blade portions being disposed a greater distance from said axis of rotation than the outermost points of connection of adjacent blade side surfaces.

4. A bladed elastic fluid wheel for operation at high rotational speeds and high temperatures comprising a first hub; blades integral with said hub and projecting radially therefrom, said blades and hub providing passages shaped to cause fluid supplied thereto to flow radially at one end of said wheel and axially at the other end, the diameter of said hub at median points between said blades being less than 75% of the maximum diameter of the wheel; a second hub co-axial with said first hub and secured thereto; and blades projecting from said second hub, the last-mentioned blades having portions disposed adjacent the outer radial extremities only in axially overlapping vibration-damping engagement with portions of the blades on said first hub, the portions of the blades between said overlapping portions and said hubs being spaced.

5. A wheel for an elastic fluid turbine comprising hub means formed for rotation about an axis; a plurality of blades projecting radially from said hub means at circumferentially spaced points, said blades and hub means being formed to provide passages to direct fluid supplied thereto radially at one end of the wheel and substantially axially at the other end, each blade having two parts extending axially of said hub means and being aligned to provide in effect a single blade structure, said parts engaging one another near the outer radial ends thereof on a plane disposed at an angle of other than 90° to a second plane extending longitudinally of said blade and containing the axis of rotation of said hub means, the engaging portions of said blades being disposed a greater distance from the axis of rotation of said hub means than the outermost peripheral portion of said hub means on a median line between adjacent blades.

References Cited in the file of this patent

UNITED STATES PATENTS

| | | |
|---|---|---|
| 1,036,627 | Huguenin | Aug. 27, 1912 |
| 1,097,729 | Rice | May 26, 1914 |
| 1,931,692 | Good | Oct. 24, 1933 |
| 1,959,703 | Birmann | May 22, 1934 |
| 2,284,141 | Funk | May 26, 1942 |
| 2,405,283 | Birmann | Aug. 6, 1946 |
| 2,429,324 | Meisser | Oct. 21, 1947 |
| 2,646,920 | Butcher | July 28, 1953 |
| 2,664,240 | Gorton | Dec. 29, 1953 |
| 2,715,011 | Schorner | Aug. 9, 1955 |

FOREIGN PATENTS

| | | |
|---|---|---|
| 113,200 | Great Britain | Feb. 14, 1918 |
| 537,916 | Great Britain | July 11, 1941 |
| 586,835 | Great Britain | Apr. 2, 1947 |
| 621,515 | Great Britain | Apr. 11, 1949 |
| 668,093 | Great Britain | Mar. 12, 1952 |